US005380436A

United States Patent [19]

Sasaki

[11] Patent Number: 5,380,436

[45] Date of Patent: Jan. 10, 1995

[54] SOLID-LIQUID SEPARATOR

[75] Inventor: Masayoshi Sasaki, Tokyo, Japan

[73] Assignee: Amukon Kabushikikaisha, Tokyo, Japan

[21] Appl. No.: 107,729

[22] PCT Filed: Feb. 18, 1993

[86] PCT No.: PCT/JP93/00199

§ 371 Date: Aug. 19, 1993

§ 102(e) Date: Aug. 19, 1993

[87] PCT Pub. No.: WO93/16867

PCT Pub. Date: Sep. 2, 1993

[30] Foreign Application Priority Data

Feb. 21, 1992 [JP] Japan .................................. 4-069996

[51] Int. Cl.$^6$ ......................... B30B 9/14; B01D 29/35; B01D 29/44

[52] U.S. Cl. .................................... 210/383; 210/385; 210/357; 210/394; 210/413; 210/415; 100/117; 100/145

[58] Field of Search ............... 210/357, 394, 385, 413, 210/414, 415, 497.01, 383; 100/116, 117, 145

[56] References Cited

U.S. PATENT DOCUMENTS 3,695,173 10/1972 Cox .
3,938,434 2/1976 Cox .
4,041,854 8/1977 Cox .
4,859,322 8/1989 Huber .
4,871,449 10/1989 Lott .
5,098,561 3/1992 Grabbe .
5,114,081 5/1992 Takenaka ........................... 210/415

FOREIGN PATENT DOCUMENTS 50-5819 3/1975 Japan .
50-38865 4/1975 Japan .
50-96048 7/1975 Japan .
53-53874 5/1978 Japan .
55-156 1/1980 Japan .
56-15810 2/1981 Japan .
57-118899 7/1982 Japan .
59-20438 5/1984 Japan .
59-125298 7/1984 Japan .
60-5323 2/1985 Japan .
61-3568 2/1986 Japan .
2-253050 9/1990 Japan .

OTHER PUBLICATIONS

Pamphlet of Suzue Noki Seisakusho with English Abstract.
Pamphlet "MES" with English Abstract.

*Primary Examiner*—Thomas M. Lithgow
*Attorney, Agent, or Firm*—Jordan and Hamburg

[57] ABSTRACT

A solid-liquid separator comprising a number of stationary rings arranged with spaces left therebetween, a number of floating rings each disposed movably in the spaces between the stationary rings and a screw conveyor provided in the inner space of the stationary and floating rings. The screw conveyor is driven in rotation to convey sludge water introduced into the space, and while being conveyed, only a water portion thereof is discharged to the exterior through the minute gaps between the floating and stationary rings. The motion of the floating ring prevents clogging of the solid portion in the minute gaps.

5 Claims, 10 Drawing Sheets

SOLID-LIQUID SEPARATOR

BACKGROUND OF THE INVENTION

The present invention relates to a solid-liquid separator which can be widely used for food processing such as production of ground meat or bean-curd, processing of sludge water, processing in paper making, dredging of bottom sludge and the like.

A conventional solid-liquid separator is constituted so that an object to be processed containing a large amount of water is placed on onto a filter cloth, and the water portion flows down through the filter cloth, while the solid portion left on the filter cloth is recovered (refer to JPB 3568 (1988)).

However, such a type of solid-liquid separator has a disadvantage in that, since clogging of the filter cloth is caused, wash water under high pressure is injected onto the filter cloth after the solid portion has been removed therefrom, and the filter cloth is cleaned, thereby preventing it from clogging. This requires large amounts of wash water in the use of the conventional solid-liquid separator, resulting in a high running cost thereof.

Further, a large-sized filter cloth must be used for enhancing a capacity of processing sludge water, and a spray nozzle is required for injecting wash water under high pressure thereto, thereby making the device larger in size and bringing about a rise in the manufacturing cost.

Hereupon, the applicant proposed a solid-liquid separator in which a plurality of rings arranged in the axial direction with minute gaps left therebetween are connected with each other to form a cylinder, and a rotary shaft inserted through the inner space of the cylinder has a plurality of vanes arranged and secured spirally along the axial direction thereof to thereby constitute a screw conveyor, each vane being provided with a cleaning edge which is adapted to protrude into each of the gaps between said plurality of rings and return the solid portion which has entered into each of the gaps to the inner space of the cylinder (refer to Japanese patent application Hei-2253050).

This solid-liquid separator makes it possible to prevent the device from clogging without injecting wash water, thereby allowing a decrease in the running cost to be planned, and allows simplification of the construction of the device and a decrease in cost.

However, since this solid-liquid separator is so constituted that the cleaning edges projecting into the gaps between the plurality of rings are rotated to remove the solid portion which has entered in the gaps to clean the separator, there are problems in that the cleaning edges must be shaped thinner and at a higher precision, bringing about a rise in cost, and, at the same time, the edges are worn out in a relatively early stage or apt to be damaged so that the vanes with the cleaning edges shaped thereon must often be replaced by new ones. Moreover, since the screw conveyor is composed of a plurality of vanes secured to the rotary shaft and each cleaning edge shaped at the end of each of the vanes must be extended correctly into the gap between the rings, each of the vanes must be mounted on and fixed to the rotary shaft at a high precision, thereby bringing about a rise in cost.

SUMMARY OF THE INVENTION

An object of the invention is to provide a solid-liquid separator which removes all the above-mentioned disadvantages of the prior art, and which prevents the occurrence of clogging as described above, while being smaller in size and lower in cost, and which makes it unnecessary to replace parts for a long period.

In order to achieve the above-mentioned object, the present invention provides a solid-liquid separator, which comprises a plurality of stationary rings arranged in the axial direction in spaced relation from each other and fixed integrally;

floating rings disposed for floating in the gaps between the stationary rings; a screw conveyor disposed rotatably in the interiors of said plurality of stationary rings and said floating rings; and a driving means for driving rotatably said conveyor.

Such a construction allows clogging of the solid-liquid separator to be prevented without injecting wash water thereto, thereby bringing about a decrease in the running cost, and further allows a simplification of the construction of the device and a decrease in cost to be achieved. Moreover, the life time of the solid-liquid separator can be extended and the mounting of each component thereof can be facilitated.

Besides, in the present invention, the inner diameter of each of the floating rings is set smaller than the outer diameter of the above-mentioned screw conveyor. With such a construction, each of the floating rings can be rotated effectively by the rotation of the screw conveyor, and can be moved radially, thereby more effectively preventing clogging of the solid portion in the gaps between the floating rings and the stationary rings.

Further, in the present invention, on the inner peripheral surface of each of the floating rings is provided a protrusion which is adapted to engage the screw conveyor to thereby force each of the floating rings to rotate integrally with the screw conveyor. With such a construction, the floating ring can be forced to rotate in synchronization with the rotation of the screw conveyor, thereby more effectively preventing clogging of the solid portion in the gaps between the floating rings and the stationary rings.

Further, in the present invention, on the outer peripheral surface of each of the floating rings is provided a liquid guiding groove extending in the circumferential direction thereof. This construction permits the liquid discharged out of the spaces between the stationary rings and the floating rings to be prevented or to be effectively suppressed from entering into the inner spaces again.

In addition, in the present invention, on the surface of the screw conveyor is formed a plurality of minute protrusions for enhancing a frictional force against the solid portion. Further, in the present invention, the screw conveyor comprises a rotary shaft and a plurality of vane pieces arranged and fixed spirally along the axial direction of the rotary shaft. This construction enhances the function of conveying the solid portion by the screw conveyor and increases the efficiency of solid-liquid separation.

DETAILED DESCRIPTION OF THE INVENTION

The present invention will now be explained with reference to the drawings concerning an embodiment of a solid-liquid separator applied to separate a large amount of sludge water discharged from general households, food processing plants, hotels or the like, into a solid portion and a water portion.

Figure 1:
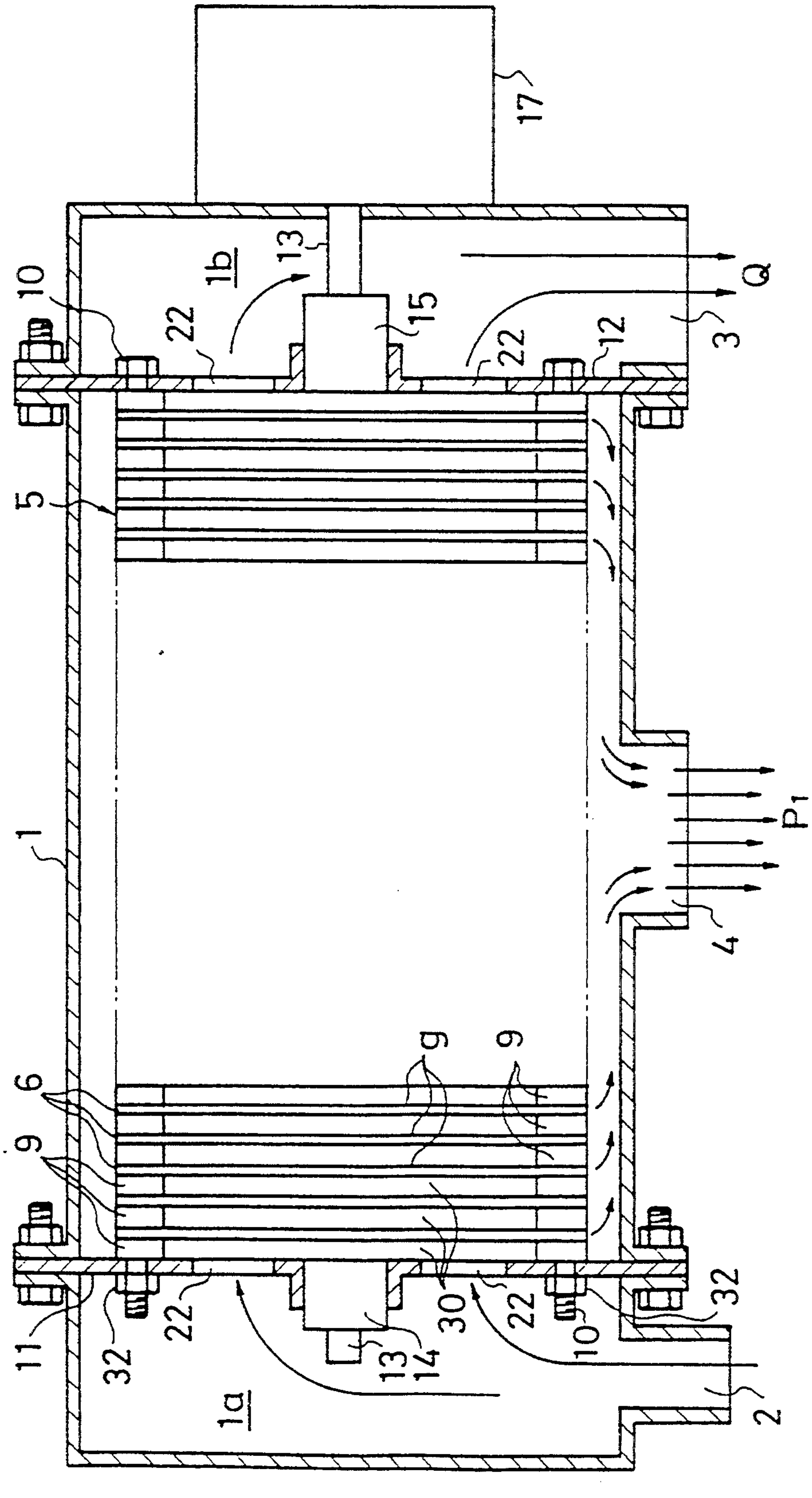
FIG. 1 is a longitudinal sectional view of a solid-liquid separator.

A solid-liquid separator shown in FIG. 1 is used to condense the sludge water discharged from a plant, and suitable to a device to remove a water portion from the sludge water, before being processed, of a water content of such a degree of 99~98.5% by weight and take out a solid portion of a water content of such a degree of 97~95% by weight. Such a solid-liquid separator is also called generally a sludge water condensing device.

This solid-liquid separator includes a hollow casing 1 which has an inflow port 2 for sludge water at the left lower portion thereof, and has a discharge port 3 for a solid portion thereof at the right lower portion thereof. Further, at the central lower portion of the casing is formed a water discharging port 4 for the separated water, and at the center of the interior thereof is provided a solid-liquid separating part 5 disposed substantially horizontally.

The sludge water which has flowed from the inflow port 2 into the interior of the casing 1, passes through the solid-liquid separating part 5, and the water portion separated therein flows down out of the water discharging part 4, while the solid portion is discharged out of the discharge port 3.

Figure 2:
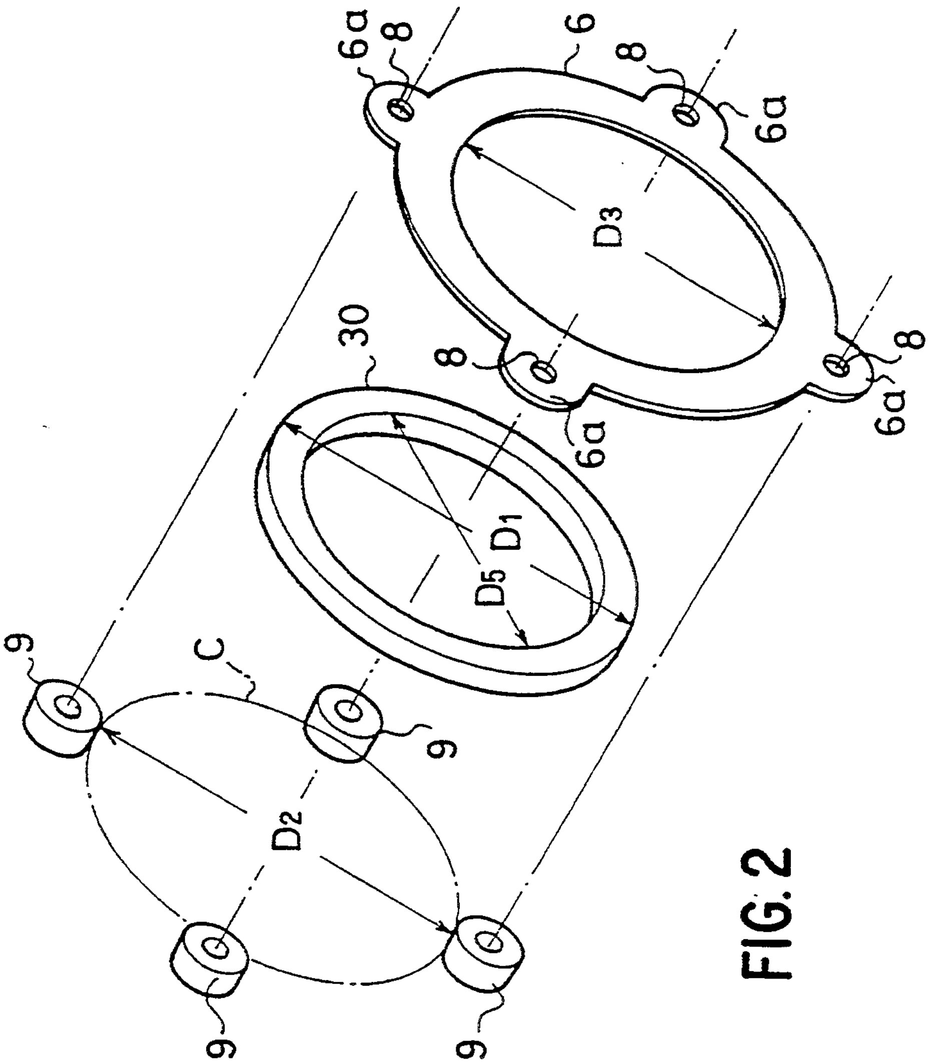
FIG. 2 is a perspective view showing a stationary ring, a floating ring and spacers.
Figure 3:
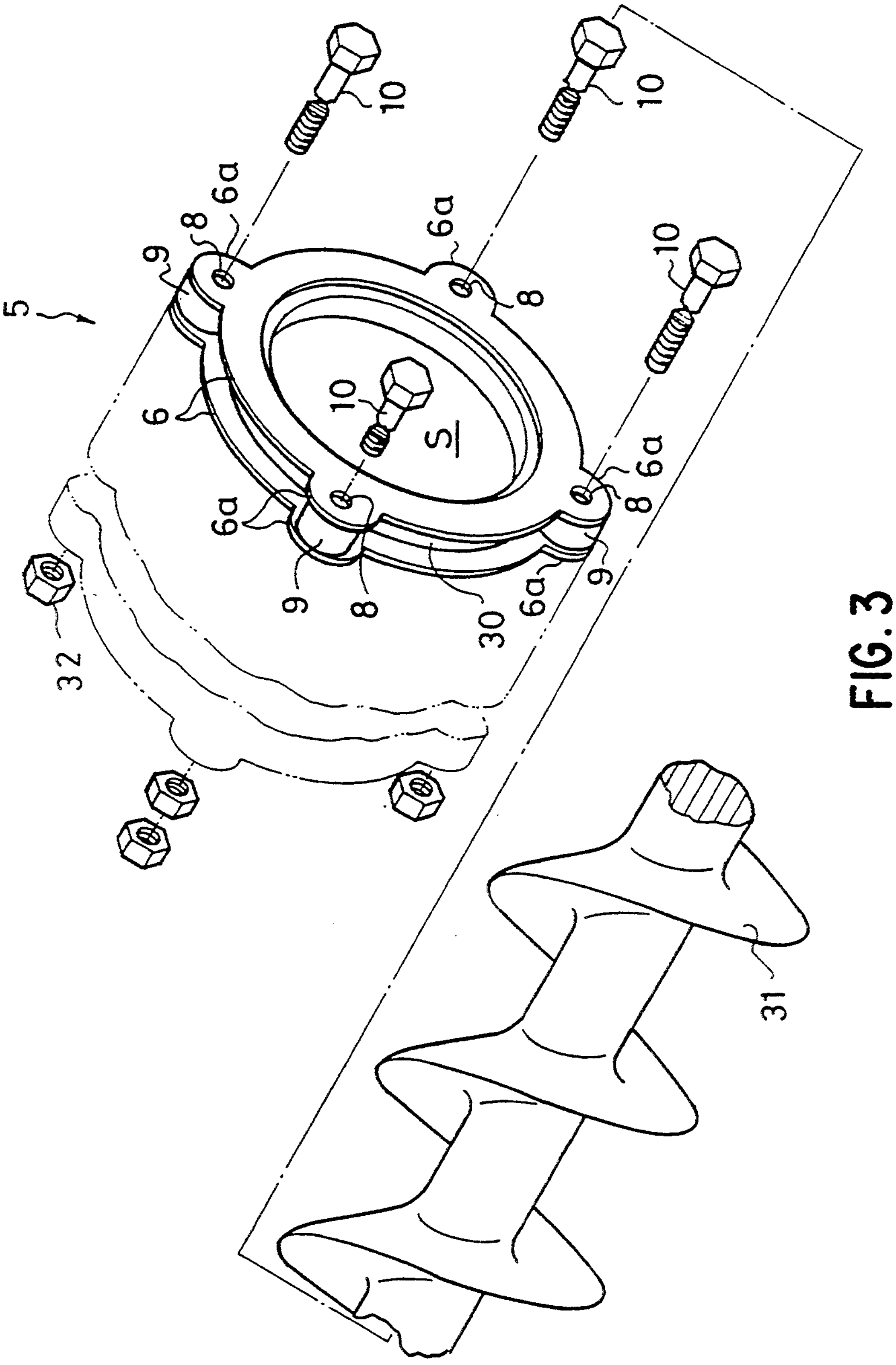
FIG. 3 is an exploded perspective view of the solid-liquid separator.
Figure 4:
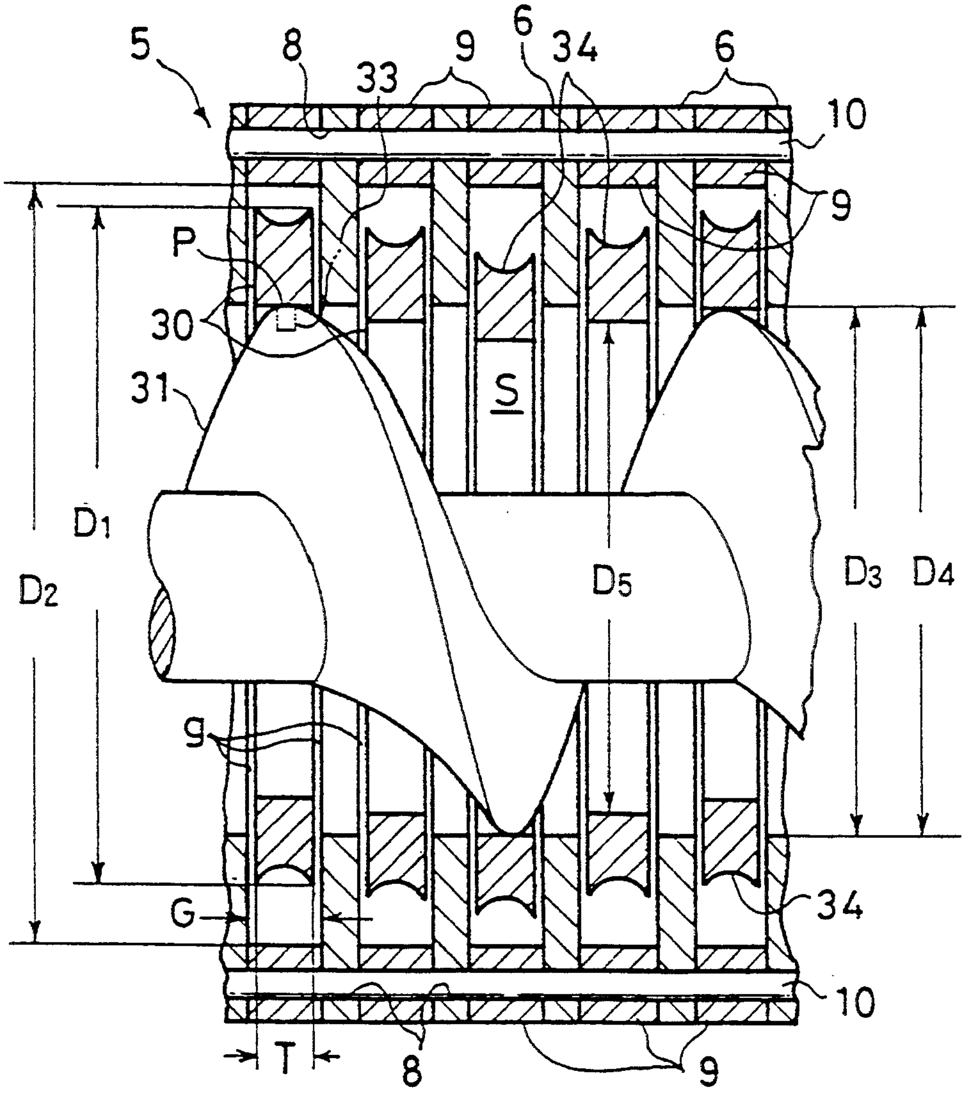
FIG. 4 is a sectional view of the solid-liquid separating part.

The solid-liquid separating part 5 has a plurality of stationary rings 6 as shown in FIG. 2, which are concentrically arranged and cylindrical in the entire shape, as shown in FIGS. 1, 3 and 4. Spacers 9 are interposed between the respective stationary rings 6, and bolts 10 are inserted through the apertures 8 provided in the ears **6*a* of each of the stationary rings 6 and the spacers 9. In this example, 4 bolts 10 are used and arranged on the same circumference. The end of each bolt 10 is fastened on supporting plates 11, 12 secured to the casing 1, by means of nuts 32, as shown in FIG. 1**.

In this way, the plurality of stationary rings 6 are arranged in the axial direction with predetermined spaces left from each other by the spacers 9, and secured integrally with each other by bolts 10 and nuts 32 and, in turn, supported fixedly on the casing 1. Protrusions similar to the spacers 9 may be additionally integrally provided on each of the stationary rings 6, to thereby form the gaps between the stationary rings 6.

Each floating ring 30 is disposed in each of the gaps between the stationary rings 6, as shown in FIGS. 1 to 4. As shown in FIG. 4, the thickness T of each of the floating rings 30 is set smaller than the width G of each of the gaps between the stationary rings ($T<G$), so that a predetermined minute gap g is formed between the end surface of each of the stationary rings 6 and the end surface of the floating ring 30 opposite thereto. For example, provided that dimensions of the width G of the gap and the thickness T of the floating ring 30 are set to 6 mm and 5 mm, respectively, the minute gap g therebetween amounts to 0.5 mm. Further, the outer diameter $D_1$ of each of the floating rings 30 is set smaller than the diameter $D_2$ of a circle C (FIG. 2) formed by the inner surfaces of 4 spacers 9 positioned around the floating ring 30, and, besides, larger than the inner diameter $D_3$ of each of the stationary rings 6. With such a construction, each of the floating rings 30 is movable in the radial direction thereof without departing from the space between the stationary rings 6, and rotatable about the center axis. In this way, the floating rings 30 each are disposed for floating motion in each of the gaps between the stationary rings.

In FIGS. 1 and 3, the stationary and floating rings at the middle portion in the form of a cylinder formed by the plurality of stationary and floating rings 6 and 30 are schematically shown only with the outline thereof using the chain line.

In the interior of the cylinder formed by the plurality of stationary and floating rings 6 and 30, there is defined a space S, as shown in FIGS. 3 and 4, in which a screw conveyor 31 is disposed, and the shaft portions 13 at both ends of the conveyor 31 are rotatably supported through bearings 14, 15 by the supporting plates 11, 12, as shown in FIG. 1.

The screw conveyor 31 disposed rotatably in the interior of the stationary and floating rings 6 and 30 as described above, is connected to and driven by a geared motor 17 supported by the casing 1. The geared motor 17 constitutes an example of a driving means for rotatably driving the screw conveyor.

Figure 5:
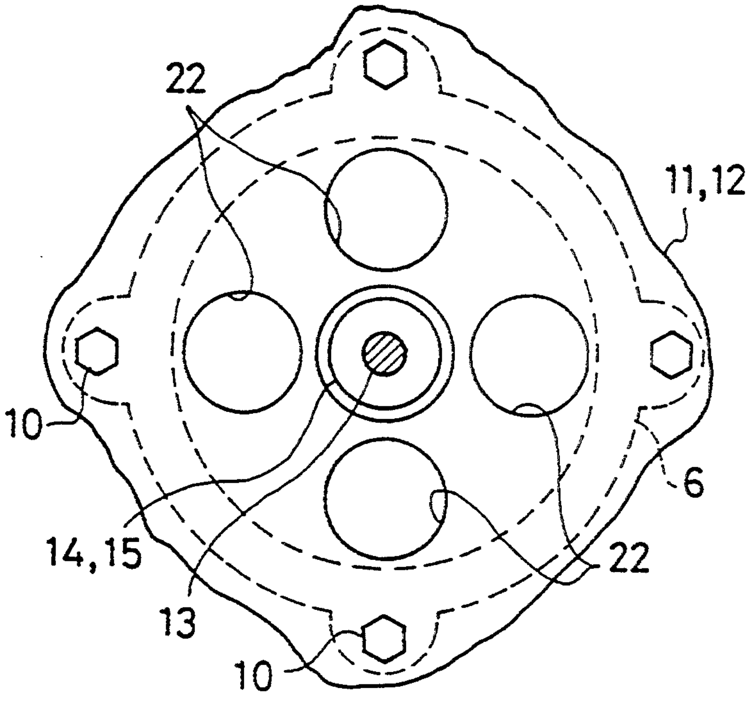
FIG. 5 is a view of the left and right supporting plates shown in FIG. 1, as viewed from the outside thereof.
Figure 6A:
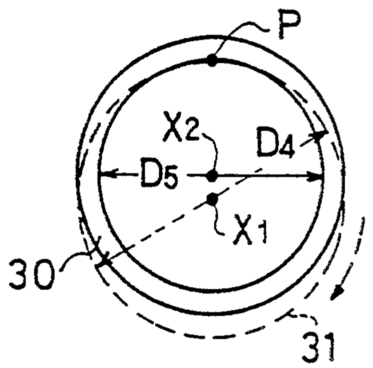
FIGS. 6(*a*)-6(*d*) is a view for explaining a series of motions of the floating ring.
Figure 6B:
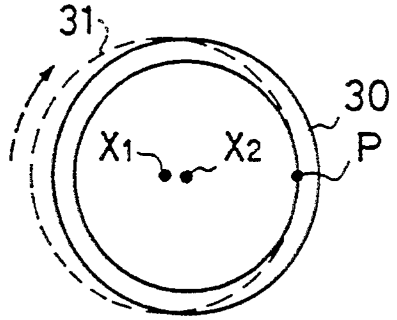
Figure 6C:
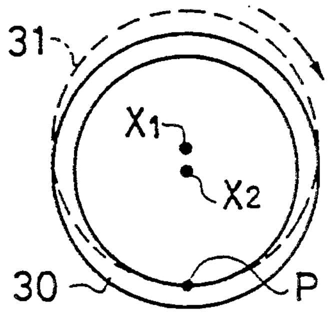
Figure 6D:
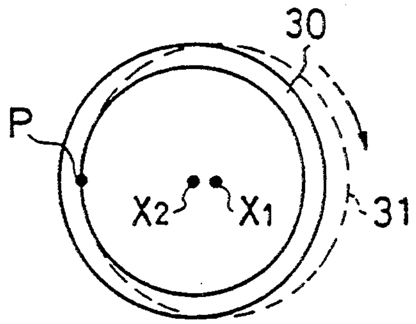

In both the supporting plates 11 and 12 secured to the casing 1, an appropriate number of through-holes 22 are provided at the positions corresponding to the inner space S of the plurality of stationary and floating rings 6 and 30, as shown in FIGS. 1 and 5.

Now, the operation of the device will be explained in detail.

Sludge water flows through a duct (not shown) from the inflow port 2 into a front chamber **1*a***. The sludge water has flocs formed due to a coagulant and a microorganism previously mixed therein and exists in a situation where a number of flocs float in the water portion. The water content of the sludge water before being processed is approximately 99~98.5% by weight, as described before.

The sludge water which has flown into the front chamber **1*a* of the casing 1, flows into the inner space S of the stationary rings 6 and floating rings 30 while overflowing the through-holes 22 of the supporting plate 11**. If the sludge water is made to flow into the inner space S with a greater head, the flocs would be broken due to the impact caused at that time. For this reason, the sludge water is made to flow to the screw conveyor 31 by overflowing, thereby preventing the flocs from being broken.

When the sludge water flows into the inner space S, the screw conveyor 31 is driven in rotation by the geared motor 17 to thereby move the sludge water through the solid-liquid part 5 from the left to the right in FIG. 1. During this movement, the water portion in the sludge water flows down naturally outwardly through each of the minute gaps g between the stationary rings 6 and the floating rings 30, and is discharged downward out of the water discharging port 4 of the casing 1 (arrow-mark P, in FIG. 1). In this way, the solid portion of the sludge water is left in the inner space S of the solid-liquid separating part 5 and is fed by the screw conveyor 31 to an after-chamber 1*b* of the casing i through the through-holes 22 of the supporting plate 12, subsequently being discharged out of the discharge port 3 of the casing 1 (arrow-mark Q).

The water content in the solid portion at that time is approximately 97~95% by weight, as described above. The reason why such a large amount of water content is left in the solid portion, is to facilitate the transferring of the solid portion to a car for conveyance while absorbing the solid portion by a vacuum pump (not shown). If the water content in the solid portion is less than the above-mentioned value, it is difficult for the vacuum pump to absorb it, and conversely, if the water content in the solid portion is more than the above-mentioned value, the efficiency of condensing the sludge water is lowered.

In this way, the solid-liquid of the sludge water can be separated in a stable condition by continuously supplying the sludge water into the inflow port 2 and rotating the screw conveyor 31.

Hereupon, in separating the sludge water into the water portion and the solid portion, a part of the solid portion entering into each of the gaps g between the stationary rings 6 and the floating rings 30 can not be avoided, and if this is left as it is, clogging of the gaps g occurs and the flowing down of the water portion becomes impossible.

However, since each of the floating rings 30 disposed between the stationary rings 6 is rotatable about the axis thereof and, at the same time, floatable in the radial direction thereof, the end surface of each of the floating rings 30 is moved violently with respect to the end surfaces of the stationary rings 6, and such a stirring motion enables the solid portion which has entered into the minute gaps to be discharged effectively out of the gaps g. In this way, the gaps g can be cleaned by the operation of the device itself to prevent it from clogging, thereby allowing the water portion to be surely discharged through the gaps g.

As described above, since occurrence of the clogging when the solid-liquid separator is operated, is prevented and the device itself performs a function of self-cleaning use of wash water to prevent the device from clogging is not required, thereby enabling the running cost to be lowered. Along with this, a spray for injection of wash water is not required. Further, since the sludge water is not loaded on the filter cloth having a large surface area, but is only made to pass through the inner space S, the device can be made smaller in size and the manufacturing cost can be lowered. Moreover, it is possible for the device to be automatically driven. Besides, the sure prevention of the clogging makes it possible to separate sludge water containing a large amount of oil, such as waste water from food systems, particularly waste water from kitchens or the like, into a solid and a liquid. With a conventional device in which a filter cloth is used, there are some cases where processing particularly the sludge water having a high content of oil can not be performed due to the clogging of the device.

With the solid-liquid separator shown in the drawings, since each of the floating rings 30 is disposed between the stationary rings 6 to prevent the device from clogging, there is no necessity of inserting and rotating between the stationary rings 6 each cleaning edge which is apt to be worn out and be broken, thereby enabling the durability of the device to be largely extended. Besides, since there is no necessity of inserting each cleaning edge between the stationary rings, mounting and dismounting of each part are considerably easy.

Moreover, even if the stationary rings 6, spacers 9 and floating rings 30 per se are thickened, each of the minute gaps g can be set to a desired size, thereby bringing about an increase in strength of the device, and besides, even if the diameters of the respective rings 6, 30 are set greater, the processing capacity can be enhanced without hindrance. For example, the diameters of the respective rings 6, 30 can be set to 500 mm to 1000 mm or more.

Hereupon, as shown in FIG. 4, the outer diameter $D_4$ of the screw conveyor 31 is set to a size equal to or slightly smaller than the inner diameter D, of the stationary ring 6 so as not to hinder the rotation of the screw conveyor. Further, the inner diameter $D_5$ of the floating ring 30 is set to an appropriate size to such a degree as not to hinder the rotation of the screw conveyor 31 and the floating motion of the floating ring 30, and then, when the inner diameter $D_5$ of the floating ring 30 is set smaller than the outer diameter $D_4$ of the screw conveyor 31, the rotation of the screw conveyor 31 causes each floating ring 30 to move in rotation effectively and to move radially in sliding motion, thereby enabling the cleaning efficiency of the gap g to be enhanced.

FIG. 6 is a view for explaining a series of motions of the floating ring 30 at that time, wherein the outline of the screw conveyor 31 is shown by a broken line. The relation between the inner diameter $D_5$ of each floating ring 30 and the outer diameter $D_4$ of the screw conveyor 31 is expressed by $D_5 < D_4$ as described above, and each floating ring 30 comes into contact with the vane of the screw conveyor 31 at a point P (also refer to FIG. 4), with each floating ring 30 being eccentric with respect to the screw conveyor 31. In FIG. 6, $X_1$ indicates the central axis of the screw conveyor 31 and $X_2$ the central axis of the floating ring 30.

Hereupon, taking one floating ring 30 as shown in FIG. 6 and assuming that the screw conveyor 30 is rotated clockwise in FIG. 6, the contact point P between the two also rotates in the same direction, and the floating ring 30 performs an eccentric movement of rotation with respect to the central axis $X_1$ of the conveyor 31 by the frictional force generated at the point P while the screw conveyor 31 is rotated fully once, as shown in FIGS. 6(*a*) to (*d*). That is, the floating ring 30 is rotated about the axis $X_2$ thereof while being radially moved in sliding motion by a stroke of $D_4$–$D_5$, which is the difference between the outer diameter $D_4$ of the screw conveyor 31 and the inner diameter $D_5$ of the floating ring 30. Since each floating ring 30 performs such a movement, the solid portion which has entered into the minute gap g between each floating ring 30 and each stationary ring 6 can be extremely efficiently discharged out of the gap, thereby effectively preventing clogging of the gap.

As shown by the chain line in FIG. 4, on the inner peripheral surface of each floating ring 30 is additionally provided a protrusion 33 which comes into contact with the vane of the screw conveyor 31, and during the rotation of the screw conveyor, each floating ring 30 may be forced to be entrained in rotation with the protrusion 33 by the screw conveyor 31 integrally therewith. Such a construction forces the floating ring 30 to be rotated more surely than the floating ring 30 being rotated by a frictional force at the contact point P between the screw conveyor 31 and the floating ring 30, thereby enabling the function of cleaning the minute gap g to be more enhanced. However, such a forcible rotation of the floating ring 30 always causes a large frictional force which acts on the floating ring 30 due to the solid portion which has entered into the minute gap g, so that there is a danger of promoting wear of the floating ring 30. Therefore, from the view point of wear of each floating ring 30 being surely reduced, the former construction as described before in which the floating ring 30 is rotated by the frictional force at the contact point P, is superior to the latter.

When the inner space S of the stationary and floating rings 6 and 30 is filled with the sludge water, it overflows out of the portion of the minute gaps positioned at the top in FIG. 1. However, there is a danger that the water portion overflowed out of the top in this way may enter again into the inner space S through the minute gaps g due to its dead weight. This will inevitably brings about a decrease in the efficiency of separating solid-liquid.

In order to prevent such a decrease from occurring, in this embodiment, on the outer peripheral surface of each floating ring 30 is formed a liquid guiding groove 34 extending over the entire circumferential length thereof, as shown in FIG. 4. The water portion which has flown out of the minute gaps at the top in FIG. 1 flows down while being guided by the guiding grooves 34 formed on the floating rings 30 and is discharged out of the discharge port 4 provided at the lower part of the casing 1. In this way, such a disadvantage where the water portion which has flown out of the minute gaps g enters into the inner space S again can be prevented or effectively suppressed.

As described above, an example of the invention applied to the device by which the sludge water is condensed so that the water content of the solid portion of the sludge water after being processed amounts to 97~95% by weight is shown; however, such a concentration can be adjusted as occasion demands by changing the number of revolutions or the longitudinal length of the screw conveyor 31 to vary the velocity of conveying the sludge water and the period of time in which the sludge water stays in the inner space S, or by changing the sizes of the minute gaps g between the stationary and floating rings 6 and 30. An increase in the number of revolutions of the screw conveyor 31 causes a decrease in the concentration, and a decrease in the number of revolutions causes an increase in the concentration. Besides, the concentration can also be adjusted by changing the angle of the arrangement of the solid-liquid separating part 5.

Figure 7:
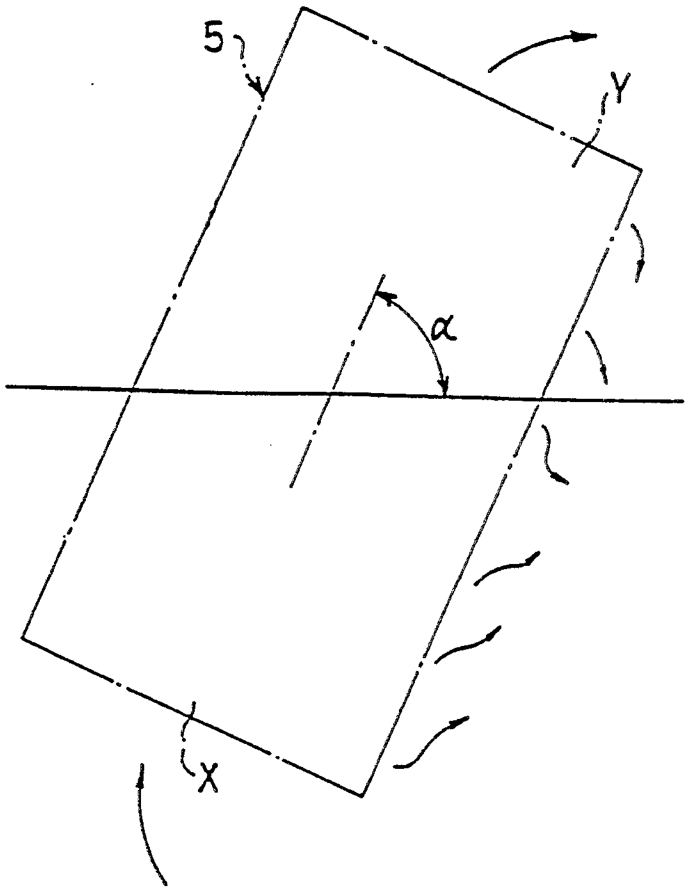
FIG. 7 is an explanatory view showing a situation of different arrangement of the solid-liquid separator.

For example, in the case where the solid portion of the sludge water after being processed is loaded on and conveyed by a dump truck, without having been drawn by means of a vacuum pump, and used for reclamation, the solid portion is required to be condensed to a water content of 85% by weight. FIG. 7 is a view showing a situation of arrangement of the solid-liquid separating part 5 in such a case. In the embodiment shown in FIG. 1, the solid-liquid separating part 5 is disposed horizontally, while in the example shown in FIG. 7, the solid-liquid separating part 5 is disposed in an inclined relation with respect to a horizontal line so that the sludge water inflow side X (the left, bottom side in FIG. 7) of the solid-liquid separating part 5 is lower than the solid portion discharging side Y (the right, top side in FIG. 7), said inclined angle a being set to, for example, an angle of 45° to 90°.

Also in this example, the basic motion for separating solid-liquid is the same as explained above; however, since the solid portion discharging side Y of the solid-liquid separating part 5 is lifted up, the inner space of the stationary and floating rings is more filled with the sludge water than in the preceeding example, and accordingly, the period of time for staying becomes longer, thereby bringing about an increase in the efficiency of separation of the water portion. This results in the sludge water being conveyed in a situation where the inner space of the solid-liquid separating part 5 near the discharging side Y is filled with the sludge water having a high concentration, from which more water content has already been separated, and accordingly, the inner pressure thereof becoming high. Therefore, this inner pressure enables the water portion of the sludge water to be discharged in a manner as to be squeezed out from each of the minute gaps g between the stationary and floating rings, and accordingly, the concentration of the solid portion is further increased until the water content of the solid portion which is discharged out of the solid-liquid separating part 5 decreased to a value lower than 85% by weight. Also this case, the floating rings 30 naturally prevent the minute gaps g from clogging. In general, such a solid-liquid separator which enables the concentration to be increased is also called a device for dewatering sludge water.

In the prior art, the solid portion having a high concentration as described above can be obtained by way two processing steps, first by using a solid-liquid separator for pre-processing to provide a solid portion of, for example, approximately 96~95% by weight, and then dewatering the obtained solid portion by means of further solid-liquid separator, while the device shown in FIG. 7 permits the solid portion having a high concentration to be obtained using only one device.

Figure 8:
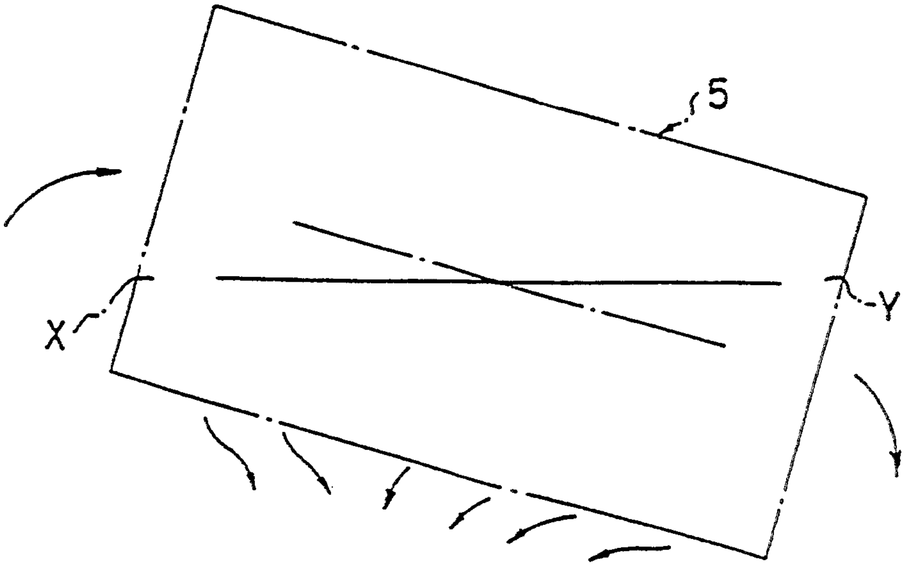
FIG. 8 is an explanatory view showing a situation of further different arrangement of the solid-liquid separator.

Further, in the two examples as described above, sludge water is condensed, while somewhat unlike these examples, there is also a case where impurities within sludge water are merely removed. In such a case, the solid-liquid separating part 5 may be disposed as shown in FIG. 8. That is, the solid-liquid separating part 5 is disposed in an inclined position so that it is higher at its inflow side X and lower at its discharging side Y. In this example, the sludge water fed into the solid-liquid separating part 5 is usually not flocculated by a coagulant, and the sludge water discharged from plants for food processing, stockbreeding processing or kitchens of hotels or the like is introduced into the solid-liquid separating part 5 without being processed. At this time, since the discharging side Y of the solid-liquid separating part 5 is lower, the rate for removing water content is lower than those in the preceeding first and second examples, and the solid portion consisting of impurities is discharged out of the discharging side Y. The basic function of solid-liquid separation is the same as that in the preceeding first example.

Figure 9:
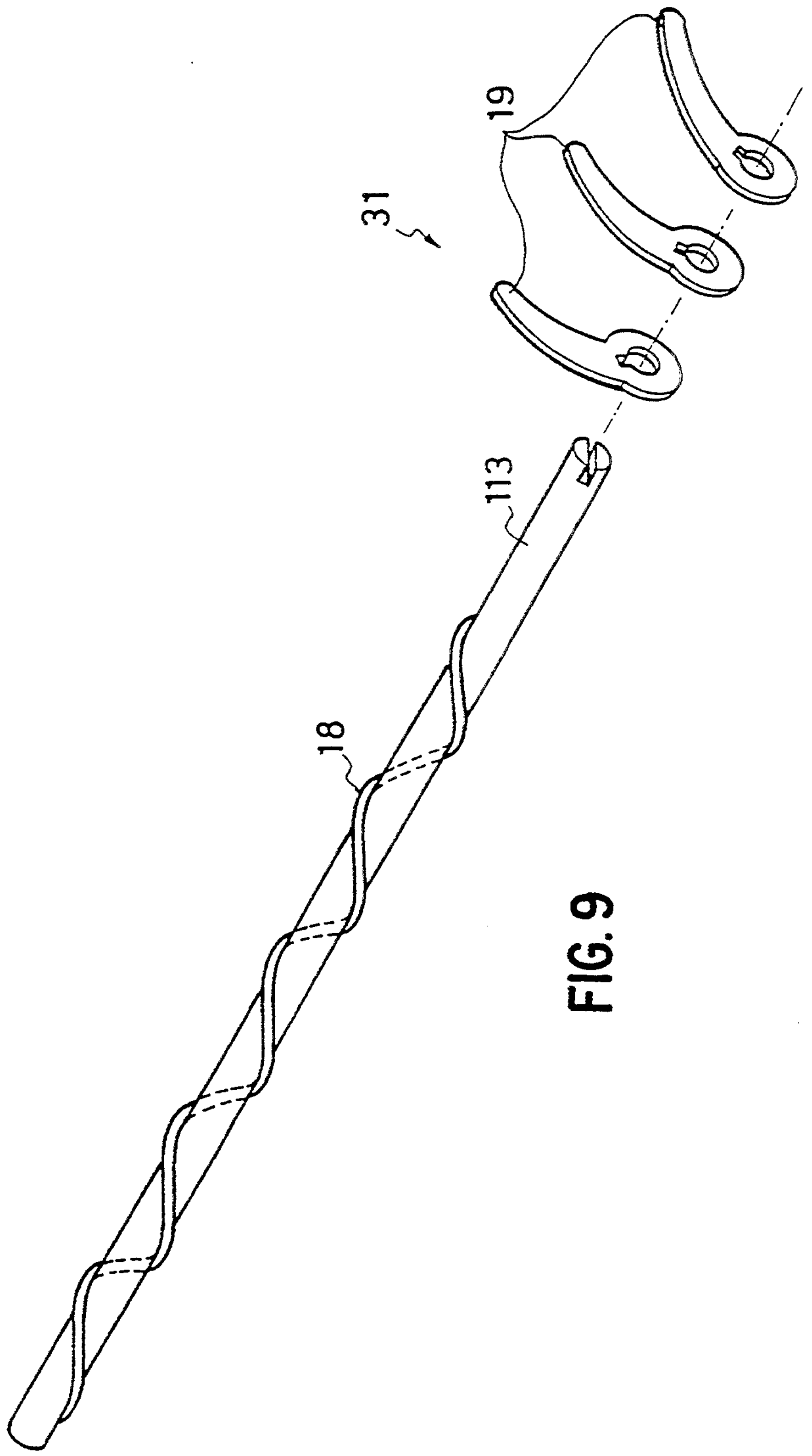
FIG. 9 is an exploded perspective view of a screw conveyor comprising a rotary shaft and a plurality of vane pieces.
Figure 10:
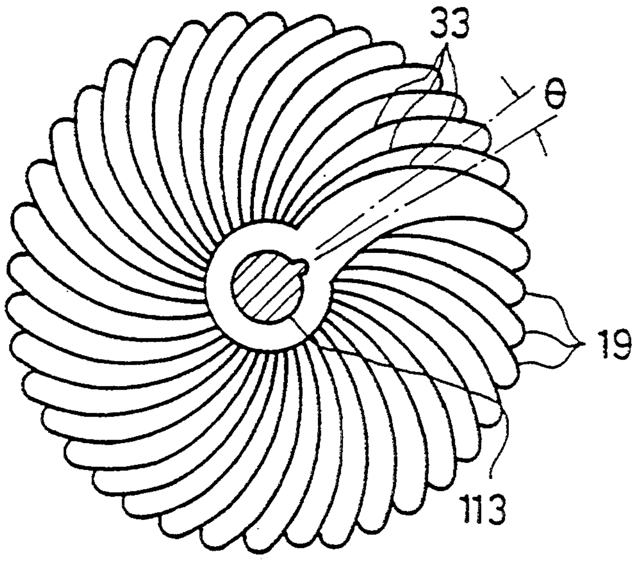
FIG. 10 is a view showing the screw conveyor comprising the rotary shaft and the plurality of vane pieces.

Hereupon, if the screw conveyor 31, which functions to convey the sludge water as described before, has a large number of minute protrusions, to increase a frictional force against the solid portion, on the surface of the vane thereof, the function of conveying the solid portion can be enhanced and the function of separating solid-liquid can be improved. In this case, the screw conveyor 31 shown in FIG. 10 may be composed of a rotary shaft 113 formed with a projecting bar 18 extending spirally as shown in FIG. 9 and a number of vanes 19 fitted on and secured to the projecting bar 18 on the rotary shaft 113 and positioned adjacent to and in close contact with each other. With such a composition, a number of stepped minute protrusions 33 may be formed by the edges of the vane pieces 19 between a number of vane pieces 19 arranged and secured spirally along the axial direction of the rotary shaft 113, and such protrusions 33 promote the function of conveying the solid portion and, therefore, enhance the function of solid-liquid separation.

Each offset angle $\theta$ (FIG. 10) made between the adjacent vane pieces 19 is set to an angle of, for example, approximately $1^\circ \sim 5^\circ$, and the smaller the offset angle $\theta$ is, the more the concentration of the sludge water can be increased. Therefore, in the case where the device for dewatering sludge water is constituted as shown in FIG. 7 if the above-mentioned screw conveyor 31 having the rotary shaft 113 and the vane pieces 19 is used and the offset angles $\theta$ thereof are set so as to become continuously or stepwise gradually smaller as the vanes proceed from the inflow side X to the discharging side Y, the result is that the inner space of the solid-liquid separating part 5 near the discharging side Y is filled with the sludge water having a high concentration, thereby allowing the inner pressure to be increased and, accordingly, the effect of squeezing out the water portion is enhanced more. Also, a screw conveyor may be constituted by providing a spiral concave groove on the rotary shaft 113 and securing a number of vane pieces 19 thereto.

Figure 11:
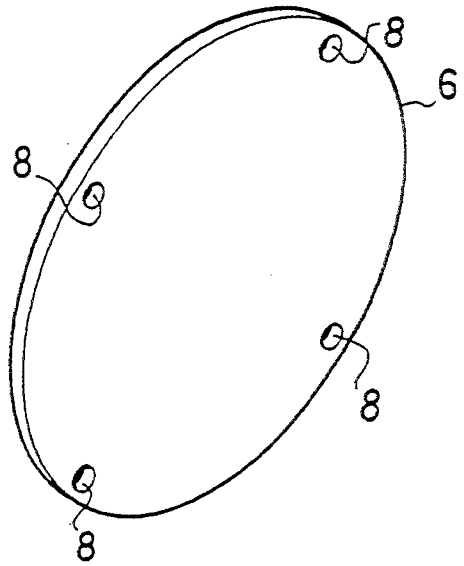
FIG. 11 is a perspective view showing a stationary ring consisting of a circular ring.

In the embodiment shown in FIG. 2, a ring having ears 6*a* on the outer periphery thereof is used for each stationary ring 6; however, since there is no necessity of arranging cleaning edges between the stationary rings, each stationary ring 6 consisting of a circular ring shown in FIG. 11 may be used. Such a circular ring 6 has an advantage in that the manufacturing cost can be lowered.

Moreover, as shown in FIG. 1, not only one solid-liquid separating part 5, but a plurality of solid-liquid separating parts, may be provided parallel to each other.

Figure 12:
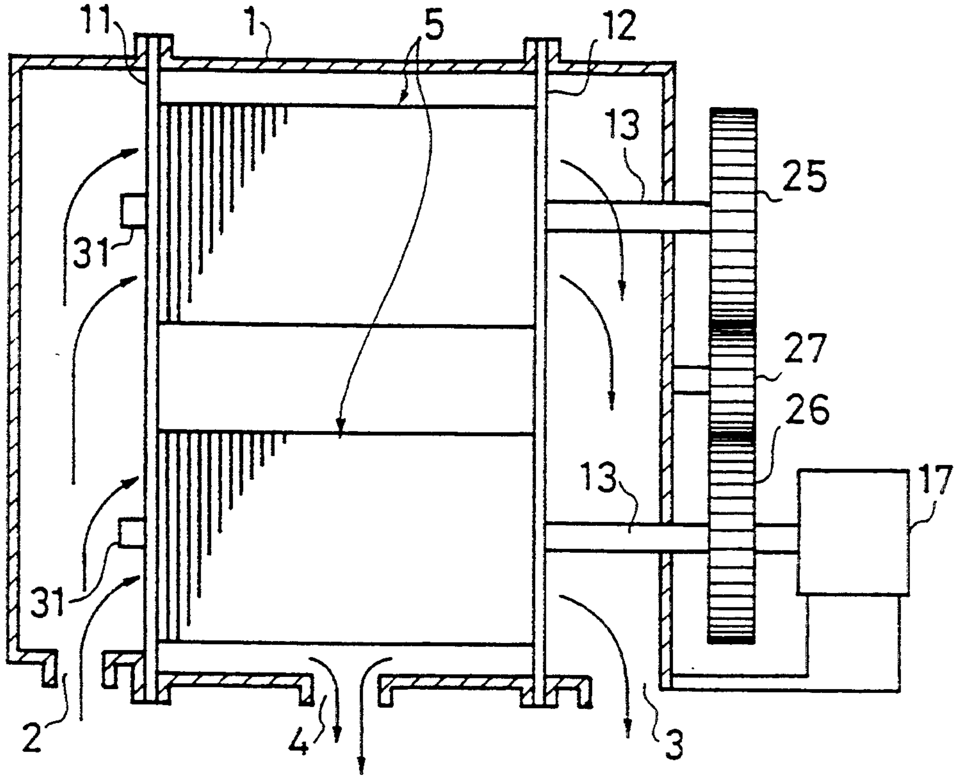
FIG. 12 is a sectional view of a solid-liquid separator provided with a plurality of solid-liquid separating parts.

FIG. 12 shows an example thereof in which two solid-liquid separating parts 5, 5 are arranged vertically within a common casing 1. In this case, when gears 25 and 26 mounted on the respective shafts 13 and 13 of screw conveyors 31 and 31 are connected with each other through an intermediate gear 27, the screw conveyors 31 and 31 of both solid-liquid separating parts 5 and 5 can be simultaneously driven by one motor 17. Of course, belts and pulleys are employed in place of the gears 25, 26, 27. In this way, the capacity of processing sludge water can be enhanced to such a degree as desired.

As described above, the solid-liquid separator according to the invention has been explained in terms of an embodiment used with the purpose of condensing sludge water; however, since, in such a solid-liquid separator, the width of the minute gap g can be freely set by setting the width of the gaps between the stationary rings 6 and the thickness of the floating rings 30 as occasion demands, the solid-liquid separator according to the invention can be widely utilized also for objects other than the solid-liquid separation of sludge water. For example, such concrete examples include production of ground meat, production of bean-curd, processing in paper making, dredging of bottom sludge, solid-liquid separation of sludge in construction, and the like.

When the device is used for food processing, there is no necessity of using cleaning edges, which are apt to be broken, for preventing the device from clogging, so there is no danger that broken pieces of the cleaning edges may be mixed into the food. Besides, since the stationary rings 6, floating rings 30 and spacers 9 can be simply disassembled, cleaning of these elements can be simply performed, and accordingly, sanitary food processing can usually be performed.

Further, since the device has no cleaning edges which are apt to be broken, and besides, each element of the device can be composed of materials such as resin, metal, ceramic and the like, solid-liquid separation of the material to be processed, for example, sludge in construction, which applies a great load to the device, can be performed without hindrance.

As described above, the solid-liquid separator according to the invention can be widely used for solid-liquid separation of sludge water, production of ground meat, production of bean-curd, processing in paper making, dredging of bottom sludge, solid-liquid separation of sludge in construction and the like.

I claim:

1. A solid-liquid separator comprising:

a plurality of stationary rings arranged in an axial direction in a spaced relation from each other and having gaps between each other, said plurality of stationary rings being integrally fixed;

floating rings disposed for floating in the gaps between the stationary rings;

a screw conveyor disposed rotatably in interiors of said plurality of stationary rings and said floating rings, an inner diameter of each of said floating rings being smaller than an outer diameter of said screw conveyor; and a driving means for rotatably driving said conveyor.

2. A solid-liquid separator as claimed in claim 1, wherein a liquid guiding groove is provided on an outer peripheral surface of each of said floating rings, said liquid guiding groove extending in a circumferential direction of each of said floating rings.

3. A solid-liquid separator as claimed in claim 1, wherein a plurality of minute protrusions are formed on a surface of said screw conveyor, plurality of minute protrusions enhancing frictional forces against a solid portion in the solid-liquid separator.

4. A solid-liquid separator as claimed in claim 3, wherein said screw conveyor includes a rotary shaft and a plurality of vane pieces arranged and fixed spirally along an axial direction of the rotary shaft.

5. A solid-liquid separator as claimed in claim 1, wherein a thickness of the floating rings is set smaller than a width of the gaps, thereby forming minute gaps between the stationary rings and the floating rings.

* * * * *